Aug. 30, 1938. B. JOHNSEN 2,128,299
LIQUID DISPENSING
Filed Dec. 15, 1937 4 Sheets-Sheet 1

INVENTOR
BJORNULF JOHNSEN
BY
Orton & Griswold
ATTORNEYS

Aug. 30, 1938.  B. JOHNSEN  2,128,299
LIQUID DISPENSING
Filed Dec. 15, 1937  4 Sheets-Sheet 3

INVENTOR
BJORNULF JOHNSEN
BY
Ayton and Griswold
ATTORNEYS

Aug. 30, 1938.   B. JOHNSEN   2,128,299
LIQUID DISPENSING
Filed Dec. 15, 1937   4 Sheets-Sheet 4

INVENTOR
BJORNULF JOHNSEN
BY
Orton and Griswold
ATTORNEYS

Patented Aug. 30, 1938

2,128,299

UNITED STATES PATENT OFFICE 2,128,299

LIQUID DISPENSING

Bjornulf Johnsen, Summit, N. J.

Application December 15, 1937, Serial No. 179,838

16 Claims. (Cl. 221—95)

This invention relates broadly to fluid dispensing devices such as are adapted to dispense gasoline and other liquid fuels at roadside service stations and the like, and of the kind in which the flow of the fluid, as from a tank or other supply, is automatic, for instance, by means of a motor driven pump, whereby the delivery of fluid is continuous and the attendant, instead of operating a pump handle to serve the fluid, may stand at the vehicle tank where he can see exactly how much the tank will hold and serve it without spilling.

In fluid dispensing devices heretofore known, the volume of fluid delivered from the nozzle has been indicated either by a pointer travelling over an indicating dial or by a dial travelling past an index. In either event, the relative movement between the index or pointer and the dial is effected from a fluid metering device recording such volume of fluid. In such fluid dispensing devices, the indicating means has usually been manually returned to zero, or in the instances where the return of the indicating device to initial position has been automatic, the release of such indicating device has been manually controlled so that a dishonest salesman, by working quickly, can cause the indicator to stop before it has returned all the way to zero and thus short-measure the purchaser. To avoid this disadvantage, it has been proposed to provide indicating mechanism for a fluid dispensing device, in which the return to the initial position or zero of the indicator, while being initiated manually, is automatic in the sense that, once the return to zero is initiated, it cannot be manually halted, and the dispensing device used to effect a sale before the indicating means has been returned to initial position. Again, where the indicating devices have been manually returned to zero and also where the indicating devices have been automatically returned to zero, means have been provided which prevent the actuation of the control means for the fluid flow establishing means until or unless the indicator is at initial position.

It is customary to provide this type of liquid dispensing apparatus with a small card to be displayed somewhere on the casing, usually at right angles thereto, the card being used to indicate the prices of various amounts of gasoline or other liquid dispensed from the device. The objections to this method of computation are that for different localities different cards must be used as the prices vary, and of course, the prices vary for the same localities from time to time. There is then the liability that the cards may not be supplied at the proper time, or, being small and destructible, may be lost, and also the objection that the figures on the card are so small that the customer purchasing gasoline from a dispensing station cannot see the numerals from his automobile, there being grave dangers of error in either case. There is a further objection that the prices on these cards are only for full gallon units, and if a fraction of a gallon is dispensed there is no way of accurately determining the cost of this amount. Also, in the usual type of meter pumps there is no positive way to dispense only a unit, and so in case the registering hand of the clock overruns the unit measure, either the customer has to pay an estimated amount, or the service station owner has to lose this fraction of a unit to the customer. It has been proposed to provide a liquid dispensing apparatus which itself registers both the amount of liquid dispensed and also registers the total price of such liquid dispensed, the means being adjustable at the liquid dispensing apparatus to correspond to any price variations of units dispensed. However, such dispensers have involved relatively expensive and complicated automatically actuated computers for indicating the quantity of liquid dispensed and the price charged or selected for the total amount of liquid so dispensed.

In copending applications, Serial Numbers 141,013 and 141,014 filed May 6, 1937, there has been disclosed and claimed liquid dispensing devices adapted to indicate not only the number of units of liquid dispensed and the fractions of a unit thereof, but also the total price of the liquid dispensed without requiring expensive and complicated mechanism. Very early attempts were made to provide indicating devices which simultaneously disclosed the total quantity of fluid delivered at a given instance together with the total instant price of the liquid dispensed but such dispensing devices, while providing for the automatic return of the indicating devices to initial position, as by power storing means, did not provide for the prevention of the establishment of flow of fluid until the indicator indicated an initial or predetermined position.

The primary object of the present invention is a liquid dispensing device of the character described at which the flow of liquid is prevented until the indicating devices, either volume or price or both, are restored to their initial position.

Yet another object of the invention is to so interrelate the controls for the fluid flow establishing means and the indicating means whereby the establishment of flow cannot be initiated unless the indicating devices indicate the zero reading ing position, while, at the same time, the indicating devices cannot be restored to initial position while the flow establishing means are operated.

Yet another object of the invention is to so interrelate the aforesaid indicating devices and the flow establishing devices in the manner described in conjunction with a movable member controlled by the nozzle whereby neither the restoring devices nor the flow establishing devices are operable unless the member is moved to a position which is permitted only when the nozzle is off its support.

A further object of the invention is to incorporate the features hereinbefore discussed in connection with a fluid dispensing device having means for permitting the interchanging of the indicated price as the price per unit of measure changes.

These and other objects of the invention and the means for their attainment will be more apparent from the following detailed description, taken in connection with the accompanying drawings illustrating one embodiment by which the invention may be realized and in which.

In the illustrated embodiment, a dispensing standard or housing 10 of any convenient shape is adopted to support and contain the devices for establishing a flow of liquid from a source of supply not shown, say, beneath the ground and for measuring the liquid delivered through a valve controlled nozzle 12 on the end of a hose 14 into, say, the fuel tank of a motor vehicle. Liquid flow elevating means, such as the pump 16, driven by a motor 18 establishes the flow of the liquid through the pipe 20 to the meter 22 from which the liquid passes by a pipe 24 to the connection 26 of the hose 14.

In the front of the housing and at a desirable elevation where it may be easily visible, or, if desired, at both the front and back, the housing 10 is formed with an opening or window 28 behind which is a dial 30. If desired the dial 30 may indicate the volume of liquid dispensed in its movement away from an initial position indicated by the index 32. Suitably carried with the housing is a supporting element or frame 34 of any desired configuration and which, in the illustrated embodiment, constitutes an upper housing section formed with the opening 28 and preferably immediately therebeneath and desirably in the vertical plane including the index 32 a second opening 36, conveniently elongated in a vertical direction, through which is displayed the indication of the instant price or cost of the volume of liquid delivered. Preferably the openings are formed in both the front and rear faces of the housing. Integral with the frame portion 34, or suitably secured thereto, is a supporting frame portion 38 shown as formed centrally of the housing with a bearing portion 40 in which is mounted a bearing shaft 42 suitably secured, as at 43, to the frame member 38. Supported from the bearing 42, as by anti-friction devices represented by the ball races 45, is a so-called drum or other suitable indicator support 47 which is carried by the arms 48 from a suitable cylindrical bearing member 49. The drum 47 carries the dial 30 on its outer face so that, as the drum rotates about the shaft 42, the dial 30 is moved with respect to the index 32. The drum 47 also carries the removable dial 37 calibrated to indicate the instant price of the volume of fluid shown on dial 30.

While any convenient means may be provided for returning the indicator to initial position, automatic means are illustrated comprising the power storing spring 50 which is shown as a coil spring, one end of which is secured to the upper end of the shaft 42 and the other end of which is fixed, as at 51, to the spider 48 on which the drum 47 is mounted. To insure that the initial position of the indicia appearing on the dials indicated in this instance by the numeral zero, reaching the predetermined position indicated by the index 32, in restoring the indicator to its initial position, a stop 53 carried on the plate 38 abuts a suitable cooperating element 54 on the spider 48.

The drum 47 is rotated about its axis 42 in proportion to the volume of fluid delivered through the meter 22 by any convenient operative connections which are capable of being rendered inoperative during the return of the indicator to predetermined position. As shown, the meter shaft carried the pinion 56 in mesh with a gear 58 on a shaft 60 the other end of which carries a pinion 62 in mesh with an annular rack 64 conveniently carried in a depending annular frame or flange 65 on the drum or spider 48. The shaft 60 rotates, as by the bearing members 67, in a reciprocating sleeve 68 slidable in a cylindrical way 69 integral with or secured to the frame 38. At each end, the sleeve 68 is formed inwardly with a shoulder receiving the bearing members 67 on the shaft 60. The sleeve 68 is of a length somewhat less than the length of the cylindrical bearing 69 so that a spring 70, shown as a coil spring, may be disposed between the bottom of the cylindrical bearing 69 and the collar 67 to normally urge the shaft upwardly to such position that the gear 58 and pinion 56 and the pinion 62 and the rack 64, respectively, are in mesh.

The shaft 60 extends below the gear 58 and is formed with a bearing member 72 receiving the bifurcated ends 74 of a bell-crank 74—76 pivoted as at 78 on some convenient portion of the frame. To the arm 76 is connected a plunger 80 formed with an enlargement 81 outwardly of the casing 10, the plunger 80 being mounted in suitable bearings in the frame 34 for sliding movement and constantly being urged outwardly or toward the left, as viewed in Figure 2, by a spring 82. At its inner end, the plunger is connected to the end of the arm 76 so that when the plunger is manually pressed, the arm 74 is racked in a clockwise direction and thereby moves the shaft 60 downwardly to bring the gears 58 and pinion 62 out of mesh with the cooperating tooth members. As will be apparent, when the gears are in mesh, the meter, which is immovable because it is filled with fluid, prevents movement of the drum. When, however, the gears are disconnected, the drum is free to turn under the influence of the spring 50, in which power was stored by the action of the flow establishing means in a previous transaction, to restore the drum to its initial position.

Controlling devices are provided between the drum and the control means for the flow establishing means. In the illustrated embodiment, the control comprises a switch, indicated generally at 85, controlling the circuit of the motor 18 in any convenient or desired fashion well understood in the art. The switch is actuated or controlled by a switch arm 86 connected, as by a link 87, with a movable member 89 illustrated as conveniently mounted in fixed relation on a rock shaft 90.

Figure 2:
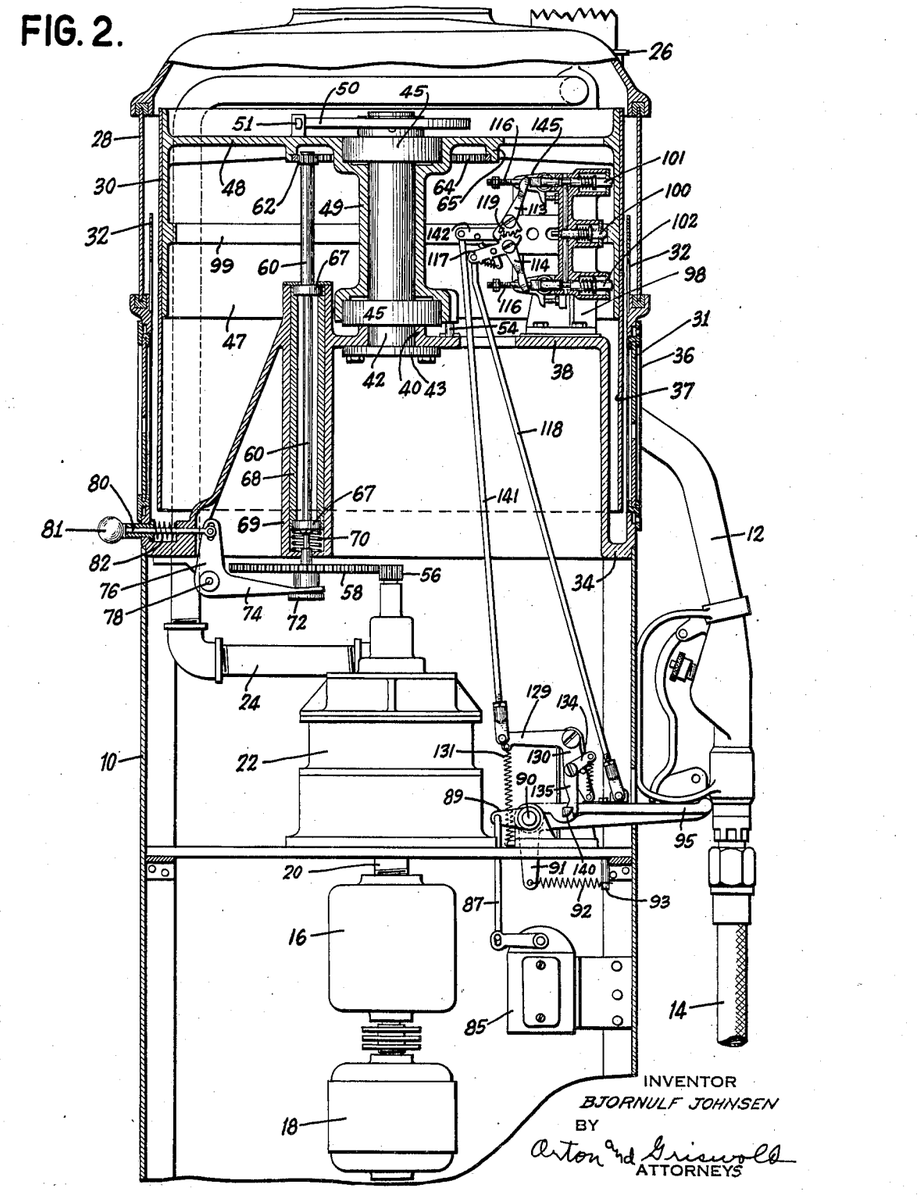
Figure 2 is a transverse vertical sectional view taken in the plane indicated by the line 2—2 of Figure 1, looking in the direction of the arrows, and showing details of construction, particularly at a time when the nozzle has just been returned to its support.

On the rock shaft 90 is fixed a depending arm 91 to the end of which is a tension member 92 shown as a coil spring connected at one end to the end of the arm 91 and at the other end to a stop or pin 93 carried with the casing so that the arm, as viewed in Figure 2, normally is urged by the spring in a counter-clockwise direction to urge the arm 89 downwardly and thereby open the switch. The structure 89—91 constitutes, in effect, a movable member which is desirably controlled by the nozzle when in supported relation with the casing. As shown, the lever arm 95, moving therewith, may be the nozzle support or hook or a member associated therewith or otherwise controlled by the nozzles, all as well known in the prior art, which arm 95 is also fixed to the shaft 90 so that when the weight of the nozzle is removed from its support, the lever 95 is urged upwardly under the influence of the spring 92, thereby actuating the switch arm 86 to close the switch and energize the motor driving the pump.

It is also within the purview of the invention to control the switch from or by the devices indicating the fluid dispensed, in this instance, the chart 30 or its carrying drum 47. As shown, a supplemental frame or standard 98 is mounted upon the frame 38 and extends upwardly within and in close proximity to the interior surface of the drum. The frame 98 is provided with bearings for three transversely movable plungers or locking pins 100, 101, and 102. These plungers 100, 101 and 102 constitute locking devices.

The plunger 100 is adapted to enter a recess 103 or aperture in the drum 47 at zero position, that is, when the drum assumes that position which, when the parts are in their proper position, will bring the indicator or index 32 and the zero on the dial 30 in registering position. The recess 103 is conveniently formed in or defined by spaced cam portions 99 on the inner surface of the drum 47.

The plunger 101 is adapted to register, at the aforesaid zero position, with an aperture 104 in the drum and with a hole 105 in the chart or dial 30, providing that the hole 105 is in register with the hole 104 in the drum 47. The object of this is to insure that the dial 30 is so disposed on the drum 47 that the zero mark thereon corresponds with the initial position of the drum. That is to say, the plunger 101 is adapted to enter an aperture 104 in the drum 47 and an aperture 105 in the dial 30 providing the indicia on the dial are in their correct position to give an exact zero reading at the zero position of the drum 47, thus insuring against a dishonest displacement of the members carrying the indicia in order to short measure a customer. If the plunger cannot advance due to the displacement of a dial, the pump motor cannot operate.

Similarly, the plunger 102 is adapted to enter an aperture 106 in the drum 47 and in a registering aperture 107 in the removable and replaceable dial 37 carrying the indications of the price. This dial, it will be noted, is carried on the lower portion of the drum 47 and by the provision of the plunger 102, assurance is had that the zero or initial reading on this dial surface shall correspond to the initial reading or zero position on the dial 30 or else the pump motor cannot operate.

The plungers 100, 101, and 102 are normally urged toward the interior surface of the drum 47 by springs 108 disposed within cylinders 109 in which the respective plungers reciprocate between a surface of the cylinder and a collar 110 on the plunger.

Figure 4:
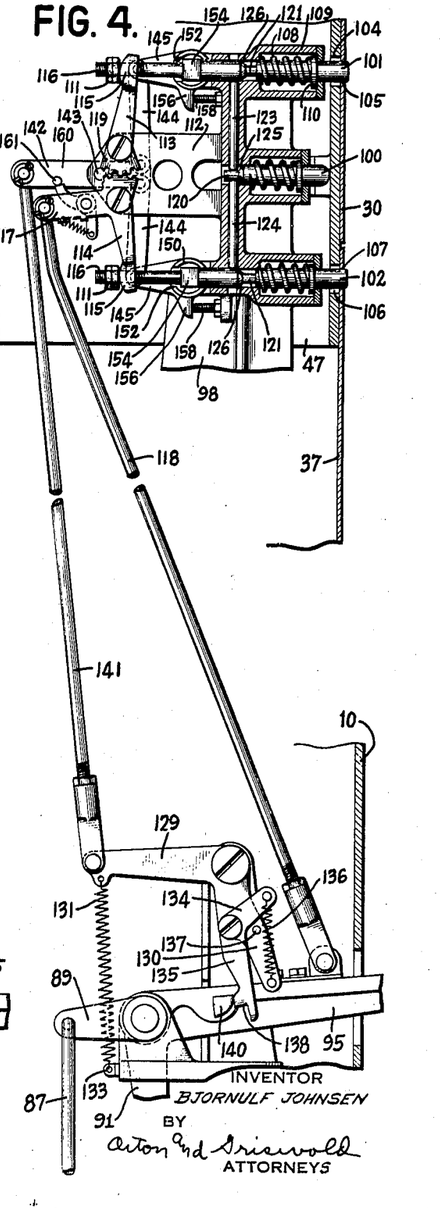
Figure 4 is a view similar to Figure 3 but showing the nozzle controlled member partly raised.

The plungers, when free to move, are controlled and actuated from the nozzle controlled member 95. Extending inwardly from the frame member 98, is a bracket 112 on which lever arms 113 and 114 are pivoted, the lever arm 113 having, at its extremity, a slot or other passage for the shank 116 of the plunger 101 and a curvilinear bearing surface 115 which bears on the adjusting nut 111. The inner end of this lever 113 is formed as a segmental gear 119, which meshes with the corresponding segmental gear 119 on the lever arm 114. Lever arm 114 is formed as a bell crank, the other end or arm 117 of which is connected by a link 118 to the movable member 95, so that when the lever 95 is raised, as viewed in Figure 4, the bell crank 114, 117 is rocked in a clockwise direction to withdraw the plunger 102 from the aperture in the drum. At the same time, the lever 113 is rocked in a counter-clockwise direction by reason of the toothed interengaging segments 119, to withdraw the plunger 101 from the aperture in the drum.

Figures 1, 10:
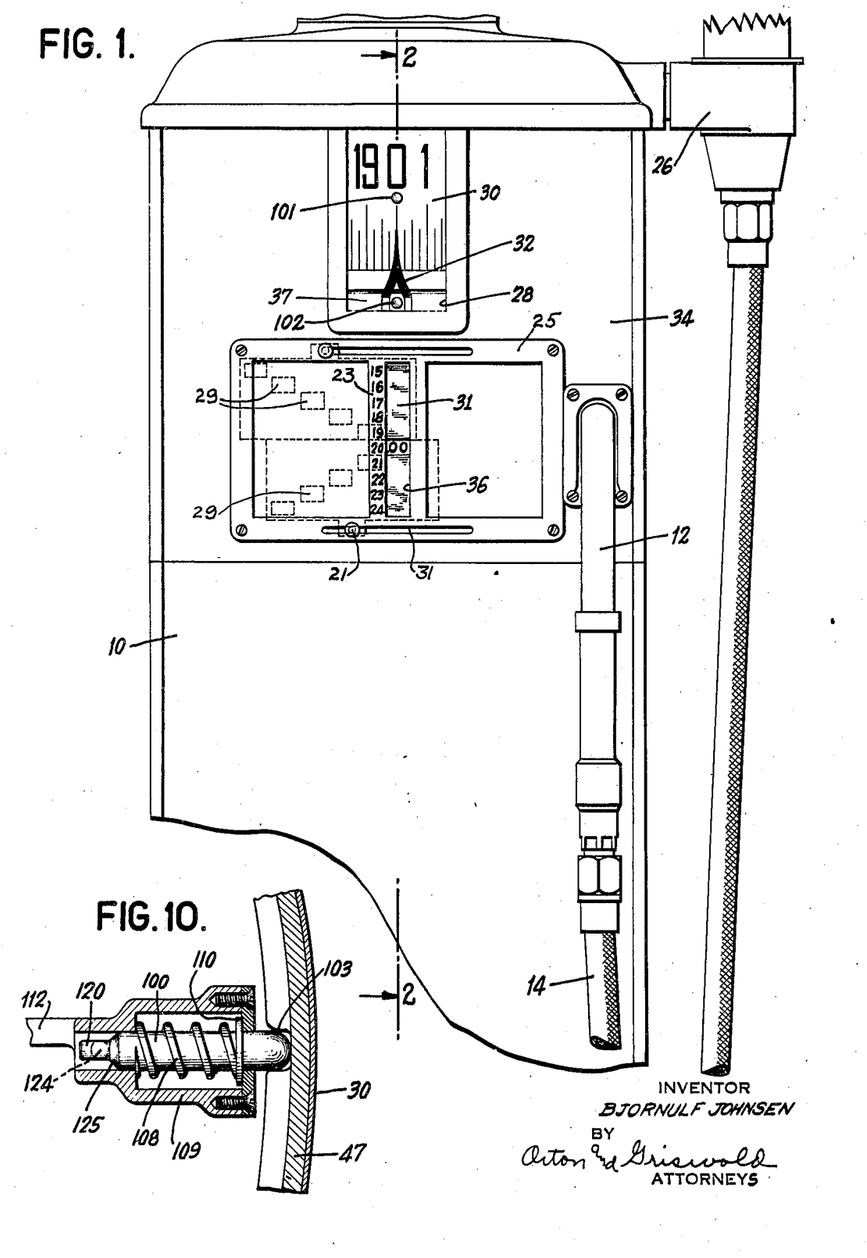
Figure 1 is a view in front elevation showing so much of a fluid dispensing device as is necessary to illustrate the price and volume indicating devices, these being shown at their zero reading position.
Figure 10 is an enlarged fragmentary sectional view taken on the plane indicated by the line 10—10 of Figure 5 and looking in the direction of the arrows.
Figure 3:
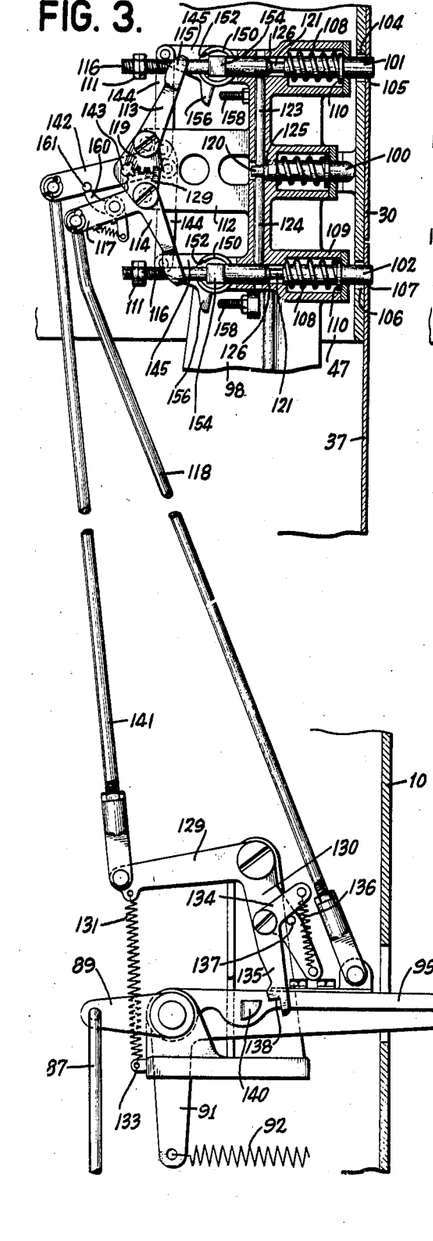
Figure 3 is a view showing details of the control devices at a time when the indicator has been restored to initial position and the nozzle controlled member ready to be moved.

As shown on an enlarged scale in Figures 3 and 10, the plunger 100 has, at its inner end, a portion of reduced diameter, indicated at 120, while the plungers 101 and 102 (Figure 4) have portions 121 of reduced diameter. These plungers 101 and 102 are longer than the plunger 100 and are threaded at their ends 116 to receive adjusting nuts 111. Between the plunger 100 and the plunger 101 and between the plunger 100 and the plunger 102 are locking rods 123, 124, respectively, which slide in the frame 98. It will be apparent as viewed, for instance, in Figure 5, that when the plungers 101, 102 are retracted, as shown in that figure, until the portions of reduced diameter 120, 121 are in line with the locking rods 123, 124 that the rods are free to enter the cut-away portions and lock the plungers in their retracted position. This is accomplished by the spring pressed plunger 100 since its portion 120 of reduced diameter has associated with the cam surface 125 which is retracted or caused to move inwardly against the action of its spring by the cam surface 99 on the inner surface of the drum. As the plunger is retracted by the rotation of the drum away from initial or zero position by the cam surface 99 defining the recess 103 in the drum, the reciprocable locking rods 123, 124 are moved into the cut-away portions 121 in the plungers, thereby locking the plungers against inward movement. This obviously can only occur when the lever 95 is raised. Conversely, when the lever 95 is depressed, as by the weight of the nozzle on the support, the link 118 is drawn downwardly moving levers 113, 114 in the opposite directions and freeing the plungers 101 and 102 for outward movement which, of course, cannot occur unless the apertures in the drum are in register with the plungers. Since the lever 95 is also connected with the switch 85, movement of the lever 95 in an upward direction resulting in the unlocking of the indicator for movement away from initial position, is accompanied by the closing of the switch. Obviously, also until the drum is at initial position, the plunger 100 cannot be projected and therefore the control means for the fluid flow establishing means cannot be placed in operative condition.

Figure 7:
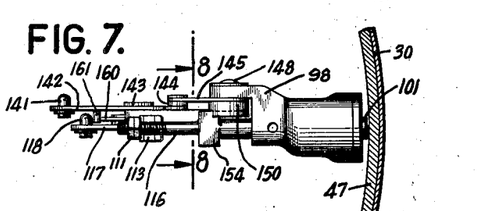
Figure 7 is a fragmentary detailed view looking from above in Figure 6 and taken on the line 7—7 of that figure.
Figure 8:
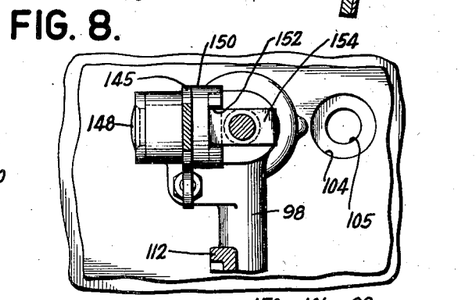
Figure 8 is a fragmentary transverse sectional view taken in the plane indicated by the line 8—8 of Figure 7, and looking in the direction of the arrows.
Figure 9:
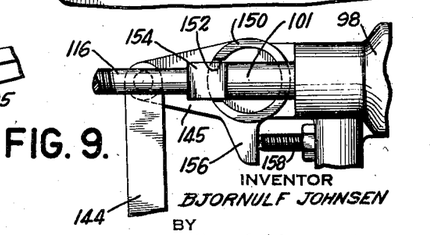
Figure 9 is a fragmentary enlarged view showing the position of the parts in the positions of Figures 5 and 6.

Provision is also made for preventing the closing of the switch except when the indicator has been returned to its predetermined position. An interlock is therefore provided between the resetting instrumentalities and the switch closing means to control the fluid flow establishing means. As shown, the lever 95 is provided with a lug or shoulder 140 and pivotally mounted adjacent thereto is a bell crank comprising a laterally extending arm 129 and a downwardly extending arm 130. The bell crank 129, 130 is normally urged to turn in a counter-clockwise direction by a spring 131 secured at one end to the end of the arm 129 and at its other end to a lug on the frame. On the arm 130, is mounted a latching lever, shown as a bell crank 134, 135 the arm 135 being connected by the spring 136 to the end of the arm 130 of the first named bell crank so that the bell crank 134, 135 is normally urged in a clockwise direction, as viewed, about its point of pivot. A stop 137 limits movement of the bell crank 134, 135 in a clockwise direction under the influence of the spring 136. The lower end of the arm 135 is formed with a latching portion shown as a rectangular cut-away part 138 which is adapted to engage the lug 140 on the nozzle contacted lever 95 when the parts are in inoperative position and to prevent the movement of the lever 95 until after the indicator has been restored to initial position. This is accomplished by connecting a link 141 to the end of the arm 129 of the latch carrying bell crank 129, 130. The other end of the link is connected with a lever arm 142 pivoted intermediate its ends as at 143 on the bracket 112. The other end of the lever 142 is connected to two links 144, the other ends of which are connected to arms 145 on rocking members 145, 150, respectively. The members 145, 150 are pivotally mounted on the frame 98, at 148, Figure 7, and carry a generally cylindrical or cup shaped locking member 150, shown in greater detail in Figures 7, 8 and 9. The locking cup or hub 150 has a sector of its wall cut away, as at 152, to permit the passage of a stop or shoulder 154 on the plungers 101, 102. The lever arms 145, Figure 9, also carries a stop surface 156 limiting, as viewed in Figure 9, the counter-clockwise rotation of the arm 145 about its pivot 148, an adjustable stop 158 being provided on the frame 98 for that purpose.

When, therefore, the arms 145 are rocked so that the cut-away portions of the walls 152 are on the axis of the plungers, movement of the plungers under the influence of the springs is permitted, the stops 158 definitely positioning the cups 150 to this end. This permits the retraction of the plungers by the lever arms 113, 114, which, of course, can occur only when the lever arm 95 is unlatched. When the lever arm 95 is depressed (Figure 3) the lug portion 140 is brought into register with the latch face 138 as shown in Figure 3, and the levers 113 and 114 are moved from the position shown in Figure 5 to the position shown in Figure 3. At this time the latch 138 cannot engage the lug 140 because the stop 137 is in the way. However, when the drum 47 is reset to its initial or zero position with the holes in register with the plungers, the plungers are permitted to enter the apertures and the stops on the plungers enter the cups as shown in Figure 3 and at this time permitting the levers 113, 114 to be moved and thus releasing the nozzle controlled member for movement to the Figure 3 position.

Figure 6:
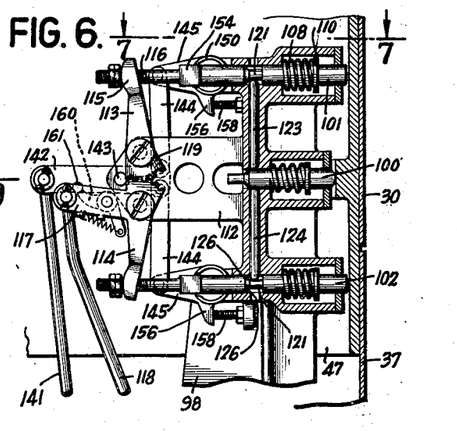
Figure 6 is a fragmentary detail view showing the position of the parts illustrated in the upper portion of Figure 5 but in the position assumed by the parts during the delivery of fluid and the recording of the volume and/or price thereof.

The operation of the apparatus is as follows: Let it be assumed that the parts occupy the position shown in Figure 2 with the nozzle controlled member 95 in its lowermost position and the switch 85 is open so that the fluid flow establishing means are inoperative. Let it also be assumed that the dial and drum are in a position recording the number of units of fluid dispensed, and the instant value thereof, in a previous transaction. The apertures in the drum and dial have therefore been moved away from their initial position and are out of register with the plungers 101 and 102. The recess 103 into which the plunger 100 extends at initial position has also been moved away from in front of the plunger and the drum cam surface 99 has caused the inward movement of the plunger whereby the cam surface 125 thereof has caused the locking rods 123 and 124 to enter the recesses 121 of the plungers 101 and 102 thereby locking them in retracted position plunger 100 being interposed between them (Figure 6). The nozzle may then be removed from its support preparatory to delivering fluid in the next transaction, but the nozzle controlled arm 95 cannot be raised to close the switch until the drum has been returned to its initial position. While any instrumentalities may be availed to this end, it is proposed in the illustrated embodiment, that the plunger 80 be pressed inwardly to release or disconnect the drum from the meter and permit the spring 50 to restore the drum to its initial position.

Figure 5:
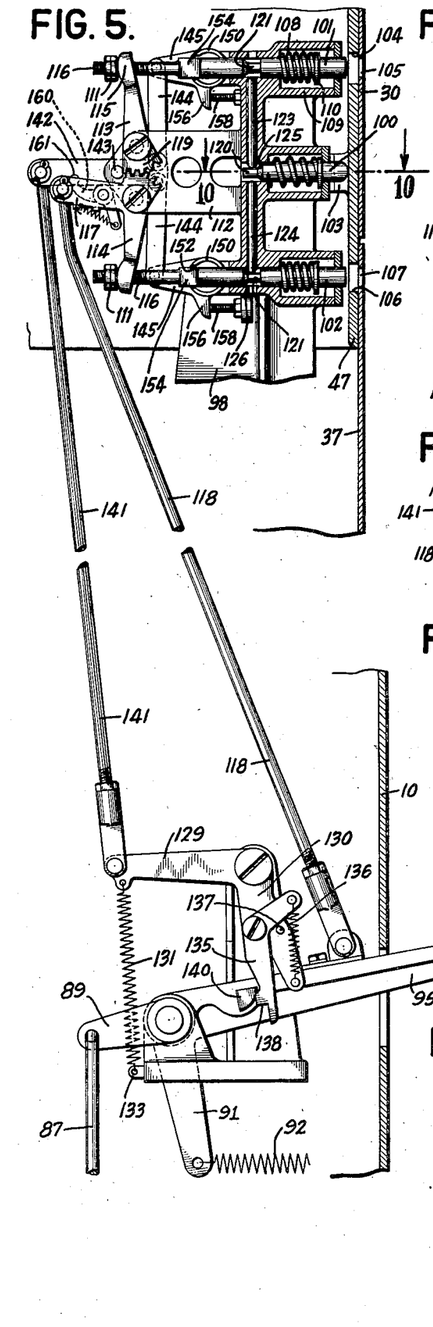
Figure 5 is a view similar to Figures 3 and 4 but with the nozzle controlled member in raised position.

An initial position, as shown in Figure 3, the plungers 101 and 102 enter the apertures 104, 105 and 106, 107 in the drum and dial while the plunger 100 is also caused to enter the recess 103 shown on the inside surface of the drum. The plunger 100 having entered the recess, the cam surface 125 is moved out of contact with the locking rods 122, 123. At this time the rods are free to move toward that portion 120 of the plunger 100 which is of reduced diameter. The plungers 101 and 102 being free to move, cam surfaces 126 on the plungers cause or facilitate the movement of the rods inwardly into the space about the reduced portion 120 of the plunger 100 thereby permitting the plungers 101 and 102 to enter the recesses as shown in Figure 3. As the plungers 101 and 102 enter the apertures 104, 106 in the drum, the locking keys 154 on the two plungers move out of the cut-away portion 152 of the rims of the cups thus permitting the rocking members 145 to move. This movement is effected by the spring 131, which causes the bell-crank 129, 130 to swing in a counter-clockwise direction, as viewed in Figure 3 and draw down the link 141. This movement is permitted because the rocking members 145 are free for movement at this time. Movement of the bell crank lever 129, 130 in a counter-clockwise direction carried with it the latching lever 134, 135 out of engagement with the lug 140 on the nozzle controlled member 95 thereby permitting the nozzle controlled member to be raised to the position shown in Figure 4, where the plungers occupy the same position as that illustrated in Figure 3. Since, however, the nozzle controlled lever 95 is raised, the link 118 causes the bell crank 114, 117 to move in a clockwise direction so that the spring pressed arm 160 which engages the lug 161 on the lever 142, raises the lever 142 with it to a substantially horizontal position whereby the cut-away portions in the latching cups are again in register with the plungers so that the keys 154 thereon are free to move outwardly as the plungers are retracted in the next transaction. This, of course, has swung the bell crank 129, 130 in a counter-clockwise direction, placing the spring 131 under tension and at the same time the spring 136 urges the bell crank 134, 135 toward and in abutting relation with the lug 140 on the nozzle controlled lever 95. As the nozzle controlled lever 95 reaches its uppermost position as indicated in Figure 5, bell crank 114, 117 and its collaborating lever 113 are so moved by link 118 as to withdraw the plungers from the apertures in the drums and store up power in the plunger springs and bring the portions 121 of reduced diameter in register with the ratching rods 123, 124 as shown in Figure 5. The drum is now free to turn under the influence of the meter as the fluid flows therethrough. Upon the closing of the switch 85, when the nozzle control lever 95 reaches its uppermost position and the drum moves away from initial position, the cam surface of recess 103 moves the plunger 100 inwardly to the position shown in Figure 6. The cam surface 125 on this plunger urges the latching rods 123 and 124 into the recesses in the plungers 101 and 102 thereby holding the plungers withdrawn while a dispensing operation is in progress, the plunger 100 riding over the interior cam surface 99 of the drum to thereby prevent the plungers 101 and 102 moving outwardly.

When the nozzle is returned to its support, the nozzle controlled lever 95 is, of course, moved downwardly to the position indicated in Figure 2 and is locked therein by the latching engagement of the latch 138 with the lug 140. The cycle is thus complete, because the switch 85 has been opened when the nozzle hook 95 assumes its down position and the nozzle support cannot be again raised because the latch 136 cannot again be raised until the dials are restored to zero.

The drum dial 37 is of such height as to permit several rows of instant prices to be placed thereon, one above the other. In the illustrated embodiment, ten such rows of prices are provided, say, when the unit price ranges from fifteen cents per gallon to twenty-four cents per gallon. In each lateral row are the instant prices for predetermined multiples of fractions of gallons from zero to twenty indicated on the dial 30. Obviously, in the plane of the zero indication on dial 30 is the numerals .00 indicating no cents when the dials are at zero reading position. In order to avoid confusion and so that no prices may be shown except at the current price per gallon, all other prices indicated on the dial 37 are adapted to be covered.

In the front of the housing is a vertical elongated slot or opening 36. A frame 25 is set within an opening in the casing 34. Slidable in this frame are shields 27, two for convenience. Each shield is formed with rectangular openings 29. The openings 29 are arranged in echelon, one opening in the horizontal plane of each unit price indication, so that as the shield is moved from one position to another the instant prices are uncovered successively, as will be understood.

The openings are so arranged that each uncovers an instant price corresponding to the price per unit shown on a frame member 23. Any means may be availed of to reciprocate the shields. As shown, a slot 31 is formed in frame 25, one for each shield, and an actuating handle 21 on the shield projects through the respective slots to permit reciprocation of the slide to uncover the instant price corresponding to the current unit price. Thus, a purchaser may immediately verify that the price he is called upon to pay corresponds to the current unit price indicated on the bar 23.

It will thus be seen that a fluid dispensing device has been provided in which the amount of fluid dispensed and the instant value thereof is visible to the purchaser, but the instrumentality affording this visible indication of the volume of fluid dispensed and the instant value thereof prevents the operation of the fluid flow establishing means unless the index of the scales or the equivalent giving these indications correctly correspond with the starting position of the apparatus and moreover, the indicating devices cannot be restored to their initial position while the fluid flow establishing means is functioning.

Various modifications will occur to those skilled in the art in the disposition and configuration of the component elements going to make up this invention as a whole as well as in the selection and/or combinations of certain of the features independently of others or the substitution therefor of other means accomplishing the same result, and no limitation is intended by the phraseology of the foregoing description or illustrations in the accompanying drawings, except as indicated in the appended claims.

What is claimed is:

1. Fluid dispensing apparatus comprising fluid flow establishing means, fluid metering means, means movable in proportion to the flow of fluid established through the metering means, a replaceable dial carried with the movable means to indicate the instant value of fluid delivered and means to prevent the operation of the fluid flow establishing means if a dial is not properly positioned on the movable means.

2. Fluid dispensing apparatus comprising fluid flow establishing means, fluid metering means, means movable in proportion to the flow of fluid established through the metering means, a replaceable dial carried with the movable means to indicate the instant volume of fluid delivered, a replaceable dial carried with the movable means to indicate the instant value of fluid delivered and means to prevent the operation of the fluid flow establishing means if a dial is not properly positioned on the movable means.

3. Fluid dispensing apparatus comprising fluid flow establishing means, fluid metering means, means movable in proportion to the flow of fluid established through the metering means, a replaceable dial carried with the movable means to indicate the instant volume of fluid delivered, a replaceable dial carried with the movable means to indicate the instant value of fluid delivered and means to prevent the operation of the fluid flow establishing means if the dials are not properly positioned on the movable means.

4. Fluid dispensing apparatus comprising fluid flow establishing means, fluid metering means, means movable in proportion to the flow of fluid established through the metering means, a replaceable apertured dial carried with the movable member to indicate the instant volume of the fluid delivered, a replaceable apertured dial carried with the movable means to indicate the instant value of the fluid delivered, and means to prevent the operation of the fluid flow establishing means if a dial is not properly positioned in the apparatus comprising a member movable in the aperture.

5. Fluid dispensing apparatus comprising fluid flow establishing means, fluid metering means, means to initiate the operation of the flow establishing means, means movable in proportion to the flow of fluid established through the metering means, a replaceable dial carried with the movable means to indicate the instant volume of the fluid delivered, a replaceable dial carried with the movable means to indicate the instant value of the fluid delivered and means to prevent the operation of the fluid flow establishing means if the dials are not at initial position comprising a movable member controlling the initiating means, the movement of said member being controlled by a dial.

6. Fluid dispensing apparatus comprising fluid flow establishing means, fluid metering means, means to initiate the operation of the flow establishing means, control means therefor, means movable proportionately to the quantity of fluid passing through the metering means, a replaceable dial carried with the movable means to indicate the instant volume and value of the fluid delivered, a plunger normally urged toward the movable means, said movable means having means to cooperate with a plunger and operative connections between the control means and the plunger.

7. In fluid dispensing apparatus, in combination, means to establish fluid flow comprising means to initiate the operation thereof, a member controlling said flow establishing means, metering means through which the fluid flows, means movable away from an initial position in proportion to the flow of fluid through the metering means and formed with a pair of apertures and a cam defined recess, a dial carried by the movable means and provided with a scale having an index and adapted to indicate the instant quantity of fluid delivered and formed with an aperture adapted to register with one of the pair of apertures when the initial position of the movable member and the index of the scale coincide, a replaceable dial carried by the movable member and carrying a scale having an index and adapted to indicate the instant volume of fluid delivered through the hose and formed with an aperture adapted to register with the other of the pair of apertures when the initial position of the movable member and the index of the scale coincide, plungers adapted to enter the apertures and the recess at initial position of the movable member and dials and means connecting the plungers with the controlling member.

8. In fluid dispensing apparatus, in combination, means to establish fluid flow comprising means to initiate the operation thereof, a member controlling said flow establishing means, metering means through which the fluid flows, means movable away from an initial position in proportion to the flow of fluid through the metering means and formed with a pair of apertures and a cam defined recess, a dial carried by the movable means and provided with a scale having an index and adapted to indicate the instant quantity of fluid delivered through the hose and formed with an aperture adapted to register with one of the pair of apertures when the initial position of the movable member and the index of the scale coincide, a replaceable dial carried by the movable member and carrying a scale having an index and adapted to indicate the instant volume of fluid delivered through the hose and formed with an aperture adapted to register with the other of the pair of apertures when the initial position of the movable member and the index of the scale coincide, spring pressed plungers adapted to enter the apertures and the recess at initial position of the movable member and dials and formed with recesses and cam surfaces, reciprocable locking rods adapted to enter the recesses in the plungers and means connecting the plungers with the controlling member.

9. In fluid dispensing apparatus, in combination, means to establish fluid flow comprising means to initiate the operation thereof, a member controlling said flow establishing means, metering means through which the fluid flows, means movable away from an initial position in proportion to the flow of fluid through the metering means and formed with a pair of apertures and a cam defined recess, a dial carried by the movable means and provided with a scale having an index and adapted to indicate the instant quantity of fluid delivered through the hose and formed with an aperture adapted to register with one of the pair of apertures when the initial position of the movable member and the index of the scale coincide, a replaceable dial carried by the movable member and carrying a scale having an index and adapted to indicate the instant volume of fluid delivered through the hose and formed with an aperture adapted to register with the other of the pair of apertures when the initial position of the movable member and the index of the scale coincide, spring pressed plungers adapted to enter the apertures and the recess at initial position of the movable member and dials and formed with recesses and cam surfaces, reciprocable locking rods adapted to enter the recesses in the plungers, means connecting the plungers with the controlling member and members adapted to engage the plungers to control the movement of the plungers out of the apertures, pivoted lever, links connecting one free end of the lever with the rotatable member, respectively, a bell-crank pivoted proximate the nozzle controlled member, a link connecting the members with the controlling members.

10. In fluid dispensing apparatus, in combination, means to establish fluid flow comprising means to initiate the operation thereof, a member controlling said flow establishing means, metering means through which the fluid flows, means movable away from an initial position in proportion to the flow of fluid through the metering means and formed with an aperture, a dial carried by the movable means and provided with a scale having an index and formed with an aperture adapted to register with the aperture when the initial position of the movable member and the index of the scale coincide, a spring pressed plunger adapted to enter the aperture at initial position of the movable member and dial, means connecting the plungers with the controlling member, said plunger being formed with locking means, a rotatable member having cooperating locking means to control the movement of the plunger out of the aperture, means connecting one rotatable member, latching means and cooperating latching means on the controlling member.

11. In fluid dispensing apparatus, in combination, means to establish fluid flow comprising means to initiate the operation thereof, a member controlling said flow establishing means, metering means through which the fluid flows, means movable away from an initial position in proportion to the flow of fluid through the metering means and formed with an aperture, a dial carried by the movable means and provided with a scale having an index and formed with an aperture adapted to register with the aperture when the initial position of the movable member and the index of the scale coincide, a spring pressed plunger adapted to enter the aperture at initial position of the movable member and dial, means connecting the plunger with the controlling member, said plunger being formed with locking means, a rotatable member having cooperating locking means to control the movement of the plunger out of the aperture, means connecting one rotatable member, latching means, cooperating latching means on the controlling member and yielding means urging the last named cooperating latching means into latching engagement.

12. In fluid dispensing apparatus, in combination, means to establish fluid flow comprising means to initiate the operation thereof, a member controlling said flow establishing means, metering means through which the fluid flows, means movable away from an initial position in proportion to the flow of fluid through the metering means and formed with an aperture, a dial carried by the movable means and provided with a scale having an index and formed with an aperture adapted to register with the aperture of the movable means when the initial position of the movable member and the index of the scale coincide, a spring pressed plunger adapted to enter the aperture at initial position of the movable member and dial, a lever arm adapted to retract the plunger from the aperture, a link connecting the lever with the controlling member, said plunger being formed with a locking key, a rotatable member adapted to engage the key to control the movement of the plunger out of the aperture, a pivoted lever, a link connecting one free end of the lever with the rotatable member, a lever pivoted proximate the nozzle controlling member, a link connecting the lever with the last named pivoted lever, a spring adapted to move the lever to actuate the pivoted lever in one direction to lock the plunger, a latching lever carried with the second named lever, a cooperating latching lug on the controlling member and a spring between the second and third named levers urging the third named lever toward latching position.

13. In fluid dispensing apparatus, in combination, means to establish fluid flow through a nozzle controlled hose comprising means to initiate the operation thereof, a nozzle controlled member controlling said flow establishing means, metering means through which the fluid flows, means movable away from an initial position in proportion to the flow of fluid through the metering means and formed with a pair of apertures and a cam defined recess, a dial carried by the movable means and carrying a scale having an index and adapted to indicate the instant quantity of fluid delivered through the hose and formed with an aperture adapted to register with one of the pair of apertures when the initial position of the movable member and the index of the scale coincide, a replaceable dial carried by the movable member and carrying a scale having an index and adapted to indicate the instant volume of fluid delivered through the hose and formed with an aperture adapted to register with the other of the pair of apertures when the initial position of the movable member and the index of the scale coincide, spring pressed plungers adapted to enter the apertures and the recess at initial position of the movable member and dials and formed with recesses and cam surfaces, transversely reciprocable locking rods adapted to enter the recesses in the plungers and of a length equal to the distance from the outer surface of one plunger to the bottom of a recess of an adjacent plunger, lever arms adapted to retract the plungers from the apertures, one of said lever arms being a bell-crank, means to move the lever arms in unison, a link connecting the other arm of the bell-crank lever with the nozzle controlled member, said lever arm actuated plungers being formed with locking keys, rotatable members adapted to engage the keys to control the movement of the plungers out of the apertures, a pivoted lever, links connecting one free end of the lever with the rotatable member, respectively, a bell-crank pivoted proximate the nozzle controlled member, a link connecting one arm of the last named bell-crank with the last named pivoted lever, a spring adapted to move the bell-crank to actuate the pivoted lever in one direction to lock the plunger, a latching lever carried with the second named bell-crank and a cooperating latching lug on the nozzle controlled member.

14. In fluid dispensing apparatus, in combination, means to establish fluid flow through a nozzle controlled hose comprising means to initiate the operation thereof, a nozzle controlled member controlling said flow establishing means, metering means through which the fluid flows, means movable away from an initial position in proportion to the flow of fluid through the metering means and formed with a pair of apertures and a cam defined recess, a dial carried by the movable means and carrying a scale having an index and adapted to indicate the instant quantity of fluid delivered through the hose and formed with an aperture adapted to register with one of the pair of apertures when the initial position of the movable member and the index of the scale coincide, a replaceable dial carried by the movable member and carrying a scale having an index and adapted to indicate the instant volume of fluid delivered through the hose and formed with an aperture adapted to register with the other of the pair of apertures when the initial position of the movable member and the index of the scale coincide, spring pressed plungers adapted to enter the apertures and the recess at initial position of the movable member and dials and formed with recesses, locking means adapted to enter the recesses in the plungers, said locking means being reciprocated by the respective plungers, lever arms adapted to retract the plungers from the apertures, respectively, interengaging means to move the lever arms in unison, a link connecting one of the levers with the nozzle controlled member, a pivoted lever, links connecting one free end of the lever with the rotatable member, respectively, a lever pivoted proximate the nozzle controlled member, a link connecting one arm of the last named lever with the last named pivoted lever, means to move the bell-crank to actuate the pivoted lever in one direction to lock the plunger, a movable arm carried with the first named lever to engage the pivoted lever arm and move it to unlocking position, a latching lever carried with the second named lever, cooperating latching means on the nozzle controlled member and means urging the third named lever toward latching position.

15. In fluid dispensing apparatus, in combination, means to establish fluid flow comprising means to initiate the operation thereof, a member controlling said flow establishing means, metering means through which the fluid flows, means movable away from an initial position in proportion to the flow of fluid through the metering means and formed with a pair of apertures and a cam defined recess, a dial carried by the movable means and carrying a scale having an index and adapted to indicate the instant quantity of fluid delivered through the hose and formed with an aperture adapted to register with one of the pair of apertures when the initial position of the movable member and the index of the scale coincide, a replaceable dial carried by the movable member and carrying a scale having an index and adapted to indicate the instant volume of fluid delivered and formed with an aperture adapted to register with the other of the pair of apertures when the initial position of the movable member and the index of the scale coincide, plungers normally adapted to enter the apertures and the recess at initial position of the movable member and dials and formed with recesses, transversely reciprocable locking rods adapted to enter the recesses in the plungers and of a length equal to the distance from the outer surface of one plunger to the bottom of a recess in an adjacent plunger, said rods being reciprocated by the respective plungers, lever arms adapted to retract the plungers from the apertures, interengaging means to move the lever arms in unison, a link connecting one lever with the member controlling the flow establishing means, means to control the movement of the plungers out of the apertures, a pivoted lever, links connecting one free end of the lever with the last named means, a bell-crank pivoted proximate the said controlling member, a link connecting one arm of the last named bell-crank with the last named pivoted lever, means urging the bell-crank to actuate the pivoted lever in one direction to lock the plunger, a movable arm carried with the first named bell-crank to engage the pivoted lever arm and move it to unlocking position, means opposing movement of said movable arm, a latching bell-crank lever carried with the second named bell-crank, a cooperating latching lug on the controlling member and a spring between the second and third named bell-cranks urging the third named bell-crank toward latching position.

16. In fluid dispensing apparatus, in combination, means to establish fluid flow through a nozzle controlled hose comprising means to initiate the operation thereof, a nozzle controlled member controlling said flow establishing means, metering means through which the fluid flows, means movable away from an initial position in proportion to the flow of fluid through the metering means and formed with a pair of apertures and a cam defined recess, a dial carried by the movable means and carrying a scale having an index and adapted to indicate the instant quantity of fluid delivered through the hose and formed with an aperture adapted to register with one of the pair of apertures when the initial position of the movable member and the index of the scale coincide, a replaceable dial carried by the movable member and carrying a scale having an index and adapted to indicate the instant volume of fluid delivered through the hose and formed with an aperture adapted to register with the other of the pair of apertures when the initial position of the movable member and the index of the scale coincide, spring pressed plungers adapted to enter the apertures and the recess at initial position of the movable member and dials and formed with recesses and cam surfaces, transversely reciprocable locking rods adapted to enter the recesses in the plungers and of a length equal to the distance from the outer surface of one plunger to the bottom of a recess in an adjacent plunger, said rods being reciprocated by the cam surface of the respective plungers, lever arms adapted to retract the plungers from the apertures, one of said lever arms being a bell-crank, interengaging means to move the lever arms in unison, a link connecting the other arm of the bell-crank lever with the nozzle controlled member, said lever arm actuated plungers being formed with locking keys, rotatable members adapted to engage the keys to control the movement of the plungers out of the apertures, a pivoted lever, links connecting one free end of the lever with the rotatable member, respectively, a bell-crank pivoted proximate the nozzle controlled member, a link connecting one arm of the last named bell-crank with the last named pivoted lever, a spring adapted to move the bell-crank to actuate a pivoted lever in one direction to lock a plunger, a movable arm carried with the first named bell-crank to engage the pivoted lever arm and move it to unlocking position, a spring opposing movement of said movable arm, a latching bell-crank lever carried with the second named bell-crank, a cooperating latching lug on the nozzle controlled member and a spring between the second and third named bell-cranks urging the third named bell-crank toward latching position.

BJORNULF JOHNSEN.